US009262536B2

(12) United States Patent  
Landa et al.

(10) Patent No.: US 9,262,536 B2  
(45) Date of Patent: Feb. 16, 2016

(54) DIRECT PAGE VIEW MEASUREMENT TAG PLACEMENT VERIFICATION

(71) Applicant: Compete, Inc., Boston, MA (US)

(72) Inventors: Alon H. Landa, Brookline, MA (US); Brian S. Ingalls, Somerville, MA (US); Jonathan Novick, Melrose, MA (US); Robert Ahrens, Edinburgh (GB)

(73) Assignee: Compete, Inc., Boston, MA (US)

( * ) Notice: Subject to any disclaimer, the term of this patent is extended or adjusted under 35 U.S.C. 154(b) by 286 days.

(21) Appl. No.: 14/103,031

(22) Filed: Dec. 11, 2013

(65) Prior Publication Data

US 2014/0164350 A1    Jun. 12, 2014

Related U.S. Application Data

(60) Provisional application No. 61/735,716, filed on Dec. 11, 2012.

(51) Int. Cl.
*G06F 7/02* (2006.01)
*G06F 17/30* (2006.01)
*H04L 29/08* (2006.01)

(52) U.S. Cl.
CPC .... *G06F 17/30867* (2013.01); *G06F 17/30876* (2013.01); *G06F 17/30882* (2013.01); *H04L 67/02* (2013.01); *H04L 67/22* (2013.01); *H04L 67/28* (2013.01)

(58) Field of Classification Search
CPC .......... G06F 17/2247; G06F 17/30876; G06F 17/30882; G06F 17/30864; G06F 17/30; G06F 17/30884
See application file for complete search history.

(56) References Cited

U.S. PATENT DOCUMENTS

| 7,769,820 | B1 | 8/2010 | Spies et al. | |
| 2002/0052928 | A1* | 5/2002 | Stern | G06F 17/30864 709/218 |
| 2005/0044139 | A1* | 2/2005 | Christian | G06Q 30/02 709/203 |
| 2009/0132524 | A1 | 5/2009 | Stouffer et al. | |
| 2009/0193007 | A1* | 7/2009 | Mastalli | G06F 17/30648 |
| 2010/0077098 | A1 | 3/2010 | Fox et al. | |
| 2011/0307462 | A1* | 12/2011 | Holsman | G06F 17/30864 707/706 |
| 2012/0131187 | A1 | 5/2012 | Cancel et al. | |

(Continued)

FOREIGN PATENT DOCUMENTS

WO    WO-2014093456    6/2014

OTHER PUBLICATIONS

WIPO, "International Application Serial No. PCT/US13/74329, Preliminary Report on Patentability mailed Jun. 25, 2015", 7 pages.

(Continued)

*Primary Examiner* — Bruce Moser  
(74) *Attorney, Agent, or Firm* — Strategic Patents, P.C.

(57) ABSTRACT

Disclosed herein are strategies for verifying placement of a direct measurement tag useful for measuring Internet traffic of a plurality of users at a website. For example, a method may include receiving web page identification data that is derived from user clickstream data, determining a URL associated with a domain based on the webpage identification information, and providing a measurement code verification web crawler with the URL and the depth to which to explore the domain for verifying measurement code placement with the web crawler.

8 Claims, 7 Drawing Sheets

(56) References Cited

U.S. PATENT DOCUMENTS

2012/0173565 A1* 7/2012 Jacobs .............. G06F 17/30873
  707/769
2012/0259882 A1  10/2012 Thakur et al.

OTHER PUBLICATIONS

"International Application Serial No. PCT/US13/74329, Search Report and Written Opinion mailed May 19, 2014", 11 pages.

* cited by examiner

DIRECT PAGE VIEW MEASUREMENT TAG PLACEMENT VERIFICATION

CROSS-REFERENCE TO RELATED APPLICATIONS

This application claims the benefit of the following provisional applications, each of which is hereby incorporated by reference in its entirety:

U.S. Patent Application No. 61/735,716, filed Dec. 11, 2012.

BACKGROUND

The methods and systems described herein generally relate to website page view measurement functionality and particularly relate to verification strategies for tag placement and operation and verification of direct measurement page view tags. Direct page view measurement requires accurate and proper tag (e.g. JavaScript) placement in a large number of web pages to ensure valid page view measurement. Ensuring that pages are properly tagged requires a robust tag verification strategy that is adaptable to use a variety of data sources, verification techniques, manual and/or automated analysis, and the like. A need exists for improved tag verification strategies and verification techniques.

SUMMARY

Techniques for direct measurement (tag-based) page view tag placement are presented herein.

In an aspect, a method of measurement code placement verification may include deriving web page identification data from a user clickstream data set, determining a URL associated with a domain based on the webpage identification data, providing the URL and the depth to which to explore the domain as inputs to a measurement code verification web crawler, and using the web crawler to verify measurement code placement at the domain. The method of claim may further include crawling linked pages in the domain with the web crawler based on links found in the URL.

In an aspect, a method may include identifying a domain for measurement code placement verification, determining a webpage URL associated with the domain, and configuring a measurement code verification web crawler with the URL and a link distance relative to the webpage, whereby the measurement code verification web crawler is configured to verify placement of measurement code on a portion of web pages associated with the domain that are accessible via the webpage URL. Determining a webpage URL involves consulting a clickstream.

In an aspect, a method of measurement code placement verification may include receiving web page identification data that is derived from search result data, determining a URL associated with a domain based on the webpage identification data, providing the URL and the depth to which to explore the domain as inputs to a measurement code verification web crawler, and verifying placement of measurement code using the web crawler. The method may further include crawling linked pages in the domain with the web crawler based on links found in the URL.

In an aspect, a method may include analyzing search result data to determine a candidate domain for measurement code placement verification, determining a webpage URL associated with the domain, and configuring a measurement code verification web crawler with the URL and a link distance relative to the webpage, whereby the measurement code verification web crawler is configured to verify measurement code placement on a portion of web pages associated with the domain that are accessible via the webpage URL.

In an aspect, a method of measurement code placement verification may include receiving domain location information for a domain for which pages present in at least one traffic data source are absent from a directly measured traffic data stream, determining a URL associated with a domain based on the domain location information, and providing the URL and the depth to which to explore the domain as inputs to a measurement code verification web crawler with for verifying placement of measurement code using the web crawler.

In an aspect, a method of verifying measurement code placement on a referring page may include accessing page view data for a domain, selecting page view data for a particular page of the domain, determining referring page data for at least one page view of the particular page, and analyzing the page view data for the domain for an occurrence of the referring page.

In an aspect, a method of identifying an incorrectly tagged web page may include accessing page view data for a plurality of web pages over a predefined time period and comparing a count of a first portion of the plurality of web pages to a count of a second web page that is not in the first portion and is linked through at least one web page of the plurality of web pages.

In an aspect, a method of verifying measurement code placement on web pages from a domain may include receiving normalized page view data derived from panel data associated with a web page, receiving direct page view data from measurement code associated with the web page, analyzing the normalized page view data and the direct page view data to determine a variance there between, and storing a result of a comparison of the variance to a threshold for facilitating verification of web page placement of the measurement code. The panel page views are identified in the page views measured by the measurement code via an associated beacon. The tolerance level for the variance is site specific, site-type specific, site size specific, site traffic amount specific, and the like.

In an aspect, a method of verifying measurement code placement on web pages from a domain may include receiving normalized page view data derived from panel data associated with a web page, receiving direct page view data from measurement code associated with the web page, analyzing the normalized page view data and the direct page view data to determine if pages present in the normalized page view data are absent from the direct page view data, and storing a result of the analysis for facilitating verification of web page placement of the measurement code.

In an aspect, a method of page view measurement detection may include executing code that detects an execution environment of a web page containing the code. comparing the detected execution environment to page view measurement acceptability criteria, and based on a result of comparing the detected execution environment to page view measurement acceptability criteria, performing one of signaling a page view and not signaling a page view.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The inventions and the following detailed description of certain embodiments thereof may be understood by reference to the following figures.

DETAILED DESCRIPTION OF THE PREFERRED EMBODIMENT(S)

Figure 1:
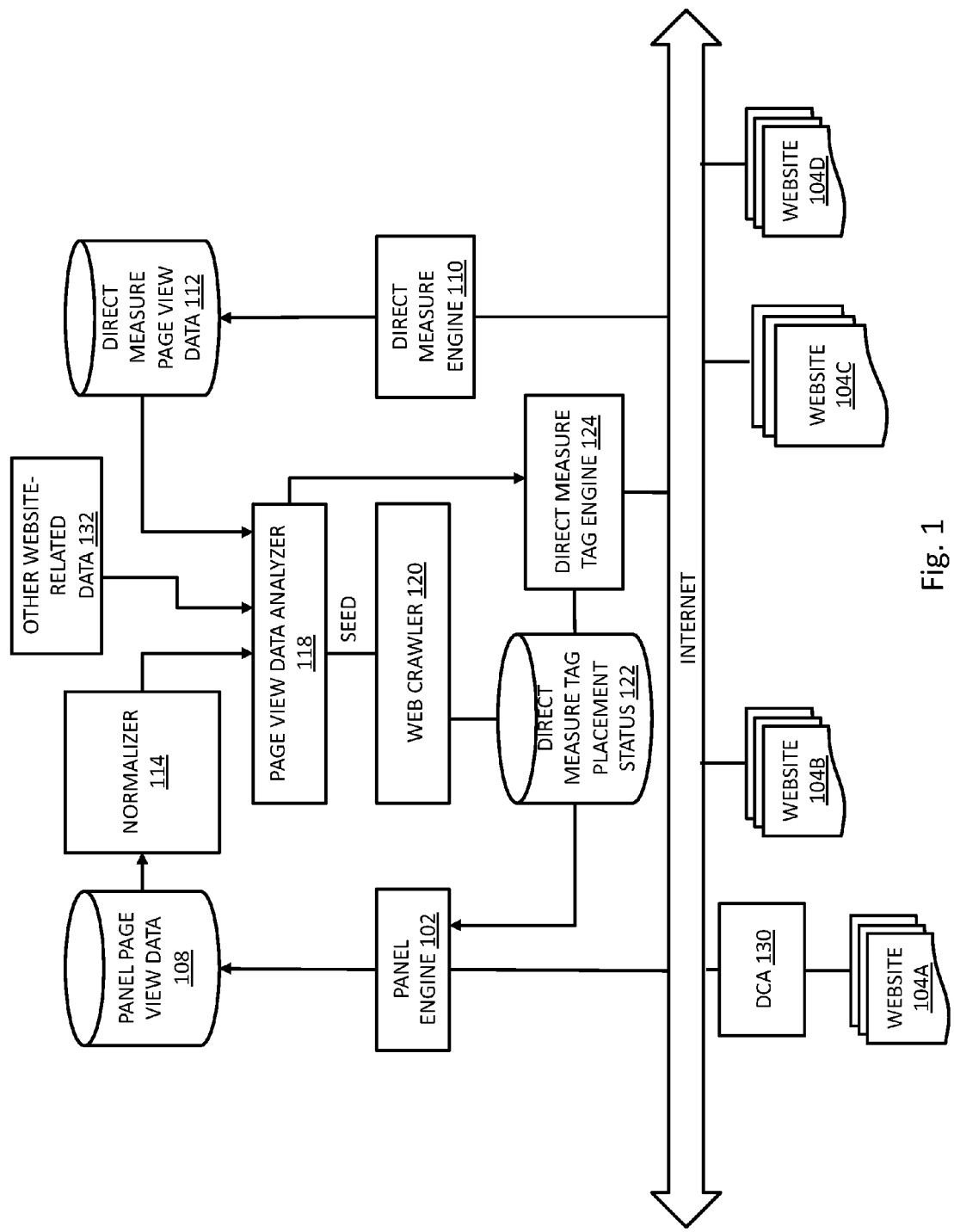
FIG. 1 depicts a direct page view measurement verification platform.

Verification of direct measurement page view tag placement via web crawling may present significant challenges for very large websites and/or for very large numbers of web pages. We envision that the crawling function for direct page view measurement can be substantively enhanced through the use of multiple sources of page view related data to guide any given crawl instance.

One such source of page view related data may include known web pages, such as those that are detected from analysis of clickstream data. Such clickstream data may be collected from a panel of web users. By guiding a web crawler to examine pages based on a known web page, the web crawler may be able to crawl a smaller number of pages while achieving comparable direct measurement tag verification results.

Another source of page view related data that may be helpful in improving web crawler functionality is search results data. Because search activity may be performed based on keywords or other relevant information, webpages may be detectable in the search results. These webpages may then be used to guide a direct measurement verification web crawler toward a subset of pages that may be linkable to or linked from the webpage found in the search results.

Yet another potential source of page view related data may be related to page view variance analysis. Page view direct measurement verification detection with a web crawler may be enhanced by identifying certain webpages that have a page view variance that exceeds a threshold or have no page views compared to a reference measure of page view and guiding the web crawler to examine these pages.

Another technique for verifying placement of direct measurement of page view tags that does not involve web crawling may be based on referring page data that is captured by properly operating page view tags. A properly operating page view tag may not only signal a view of the current page being accessed but may also capture the URL of the referring page. This may happen conventionally when a link in a referring page is accessed to view the current page. By tracing back the referring page links, it may be possible to identify referring pages that are not properly tagged. This may be done in a variety of ways, such as checking a database of page view data to see if the referring page URL is included in that data.

Yet another technique for verifying placement of direct measurement page view tags may involve comparing multiple sources of page view data for identical pages over a specific timeframe. If multiple sources of page view data for identical pages over an identical time yield different results, then the pages should be inspected to ensure that the direct measurement page view tags are properly configured.

Page view variance analysis may also be used to compare normalized page view numbers, such as page view numbers that are derived from a control panel of users, with direct measurement page view numbers. The result of the comparison may be analyzed against a variance threshold and based on that analysis, such as if the variance is greater than the threshold or if page views from the panel of users are absent in the direct measurement page view data, the webpages may need to be examined for proper page view tagging. In such an application of page view variance analysis, considerations of website size, website type, website traffic, website recency, and the like may be factored into the threshold analysis. The expectation is that every panel event would have a corresponding event in the direct measurement data. A user on the web can be readily identified by an event that happens, such as by a time of the event, a URL they went to, a cookie that was generated, and so forth. Thus, on a given calendar day, if there are no visits to a URL recorded by the direct measurement data that are present in the panel data, the direct measurement tag may need to be verified.

In another embodiment, the DCA 130 may interact with the direct measurement code. In some embodiments, the DCA 130 may alter the way a user's browser interacts with the direct measurement code, such as to create or modify a pixel fire or some other event. Such modification to the event by the DCA 130 may be explicitly identifiable in the direct measurement data and may be used to identify a panel user in the direct measurement data. In one example, the event that occurs normally when the direct measurement code is encountered by the user still takes place, but a follow-up event may be sent that explicitly identifies the user as a panelist. In another example, a modified event may be sent upon encountering the direct measurement code that explicitly identifies the user as a panelist.

Each of these possible direct measurement page view verification techniques may be most suitable for selected types of websites, such as smaller websites with fewer pages, larger websites with tens of thousands of pages, and the like. Determining which verification technique to apply may be decided automatically by following a decision tree analysis of various website related metadata, such as size, type, traffic, recency, web host, and the like.

To ensure that direct measurement page view tags facilitate proper page view data collection, the page view tag software may need to be adapted so that it identifies the kind of environment in which it is running and based on that identification determining whether it should signal a page view as a result of the tag being executed. This type of smart direct measurement page view tag may be quite helpful in distinguishing between machine generated views, such as web crawler access of a webpage, execution of the tag in a widget, and other types of non-user page view actions.

Direct page view measurement functionality, such as page view tag code configured in webpages may be used in association with panel-based page view counts to facilitate improved analysis of page views for website domains. A goal of using these page view data sources in combination may be to better inform the panel data regarding page view activity to improve reporting on the metrics associated with domains for which panel data is captured. Challenges present in such an environment include poor page tagging results due to missed page views, missed page visits, incorrectly counted visits, and the like. Problems that may be manifested in poor tagging results may include non-tagged pages, over-tagged pages (e.g. multiply tagged pages, artificially increased tag results), tagged non-pages (e.g. a tag being present and executed in something other than a page, such as a widget), and machine visit results in tags reporting visits due to Web crawlers or search engine scans and the like.

As described herein page view tag placement verification strategies may include seeding a web crawler based on a variety of data sources to detect unique paths to assist in finding pockets of missing pages due to a lack of tags in the pages. Another technique described herein is the use of data generated by the tag itself, such as to identify a referring page and therefore verify if the referring page is properly tagged. Data generated by the tag itself may be combined with data from click stream data of a panel of users in an analysis function that may facilitate identifying pages within a domain that may include links to other pages in the domain (as may be determined by examining the panel click stream data) but do not appear in the referring pages information from the tag itself. In an example of referring page analysis, if a click stream analysis shows that a 1st page is accessed by a user and the user clicks on a link in the 1st page to bring up a 2nd page in the user's browser, the referring relationship of the 1st page to the 2nd page can be known. This known referring relationship may be used in an analysis of the direct measurement page view data to determine which referring page should be verified as being tagged.

Generally, analysis of page view data from multiple sources may facilitate identifying overly tagged pages, such as pages that result in multiple page view counts for a single page view. Detecting pages that result in multiple page view counts for a single page view may help reduce the impact of users who maliciously hack direct measurement page view tags to artificially increase their page view counts. Detecting double or triple page view counts for a single page access may facilitate adjusting page view counts for these pages to be aligned with a single page view count for a single page access.

Panel-based page view data may be enhanced by adding a beacon so that pages that have been viewed by panel members may be identified uniquely in the direct measurement page view results. Because a beacon allows for unique identification of panelist visits to a webpage, even a small page view count variance may signal a problem with the direct page view measurement functionality. Therefore using a beacon may facilitate tighter tolerances in page view count variance analysis as described herein.

To provide page view direct measurement tag placement verification functionality for a large number of domains it may be prudent to perform verification of direct measurement tag data that meets a degree of confidence factor, but may not require verifying tag placement on 100% of all pages. Therefore different verification strategies, or different tolerances for verification may be established by a verification platform based on website related attributes, such as metadata, third-party data, and the like.

Because page view direct measurement tag code may be placed in portions of a webpage, such as an I-frame, or a widget that may itself not be a separate page to be viewed, strategies for handling page view counts for these elements may be enhanced by the use of direct measurement page view counts and panel based page view counts. In one example panel based click stream data may facilitate identifying widgets and therefore may facilitate adjusting direct measurement page view count results for widgets that can be identified. In a simple example of using panel-based click stream data to filter out widget page view results, identification information such as a widget URL or other identifying data may be provided to a direct measurement page view analysis engine that may strip out or otherwise separately count widget results.

Combining panel based page view data with direct measurement page view data may also facilitate detecting fraudulent direct page view functionality. One example of this combination may be used to identify a webpage that sends fake/synthetic data to a pixel server.

A source of data that may be particularly helpful in verification of direct measurement page view tag performance is click stream and/or URL/page information that may be collected from a control panel of users. Such a data source typically involves capturing individual users' internet traffic. Various techniques described in related applications, such as U.S. patent application Ser. No. 13/359,901, may be used to normalize panel information so that it may be applied to any demographic-specific population of web users, or more generally to all web users. This normalized information may be used to validate direct measurement tag placement. Likewise direct measurement page view data may be used to validate the normalization methods applied to panel data.

A direct measurement page view tag verification platform may include a variety of data sources, functional blocks for analyzing page view data, computation engines for gathering and assimilating page view data, functionality for accessing website pages such as with a web crawler to detect tags on pages that may facilitate direct page view measurement, various databases such as direct measurement tag placement status data sets, web or Internet interfaces, and the like. Such a platform may perform functions such as the methods and systems described herein to verify and adapt page view results and interpretation of such results for improved page view assessment information.

An example of such a platform may be found in FIG. 1. Users may fetch content from a variety of tagged websites 128, and as a result, a direct measurement engine 110 may receive page view information from functional tags that may be configured in a portion of the tagged websites 128, and may store the page view data in a direct measure page view data storage facility 112. Additionally, in this example, a DCA 130 may collect panelists' browsing behavior and transmit it to a panel engine 102, which may be a data collection server, to collect panel user information about a variety of websites visited by users, here depicted as website 104A, and may store page view data associated with the panel of users in a panel page view data storage facility 108. In other embodiments of the platform, panel data may not be collected. A normalizing facility 114, may receive or access panel page view data from panel page view data storage facility 108 and may generate normalized page view data suitable for analysis by a page view data analyzer 118. The page view data analyzer 118 may also receive or access page view data from direct measure page view data storage facility 108. The page view data analyzer 118 may also have access to non-page view data such as search results data, page view variance analysis data, and other types of website page related data 132 for facilitating analysis of page view data. An output of the page view data analyzer 118 may include one or more seed web pages, such as a URL, that may be suitable for use by a web crawler. A web crawler 120 may analyze webpages throughout the Internet, such as tagged webpages 104A-D to determine if direct measurement tags are properly placed on the webpages. The status of web crawling may be stored in a direct measure tag placement status storage facility 122. A direct measure tag engine 124 may access the status to facilitate update or correction of tag placement related problems. The direct measure tag engine 124 may also receive other data output from page view data analyzer 118 to determine actions to be taken with regards to tag placement problems.

Seeding a web crawler for a particular page depth to which explore the domain for verifying direct measurement code placement may also be based on a domain for which at least one page view variance exceeds a threshold. Calculating page view variance may include determining a difference between a first page view count and a second page view count for a particular page of a domain. If a calculated variance exceeds a threshold, such as a predetermined threshold or a threshold that is contextually determined, a page or a domain associated with the page may be identified for seeding the web crawler. In an example, a homepage or other page (e.g. the page for which the variance exceeds a threshold) may be provided to the web crawler for searching through web page content to verify direct measurement page view tag placement. In most cases, the page view variance involves the case where webpages seen by the panel or other sources are completely absent from the directly measured data stream.

Figure 2:
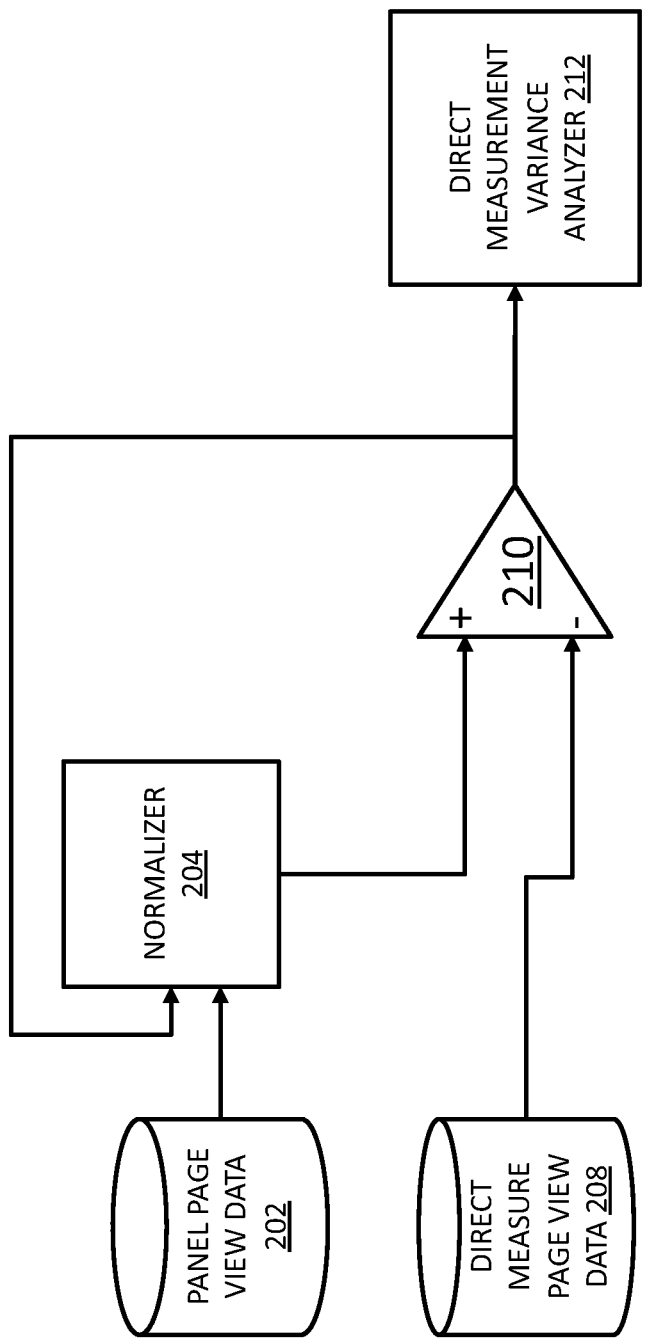
FIG. 2 depicts variance analysis of panel and direct measurement page view data.

Referring to FIG. 2, which depicts an exemplary embodiment for calculating a page view variance, panel page view data 202 may be processed through a normalizer 204 and compared with direct measure page view data 208 in a page view variance facility 210. The results of this variance determination may be provided to a direct measurement variance analyzer 212. Also the variance determination may optionally be provided to the normalizer 204 for adjusting normalization functionality, so that a normalized panel page view data output is more aligned with the direct measurement page view data for a given page or domain.

Direct page view measurement verification may also be facilitated by accessing information provided from an active direct page view tag facility such as JavaScript or other code suitable for use in a web browser to determine a referring page that included a link to the current page being viewed. By accessing page view data for a domain such as a website of pages, and selecting page view data for a particular page of the domain, it may be possible to determine the referring page and analyzing page view data for the domain for an occurrence of the referring page.

Figure 3:
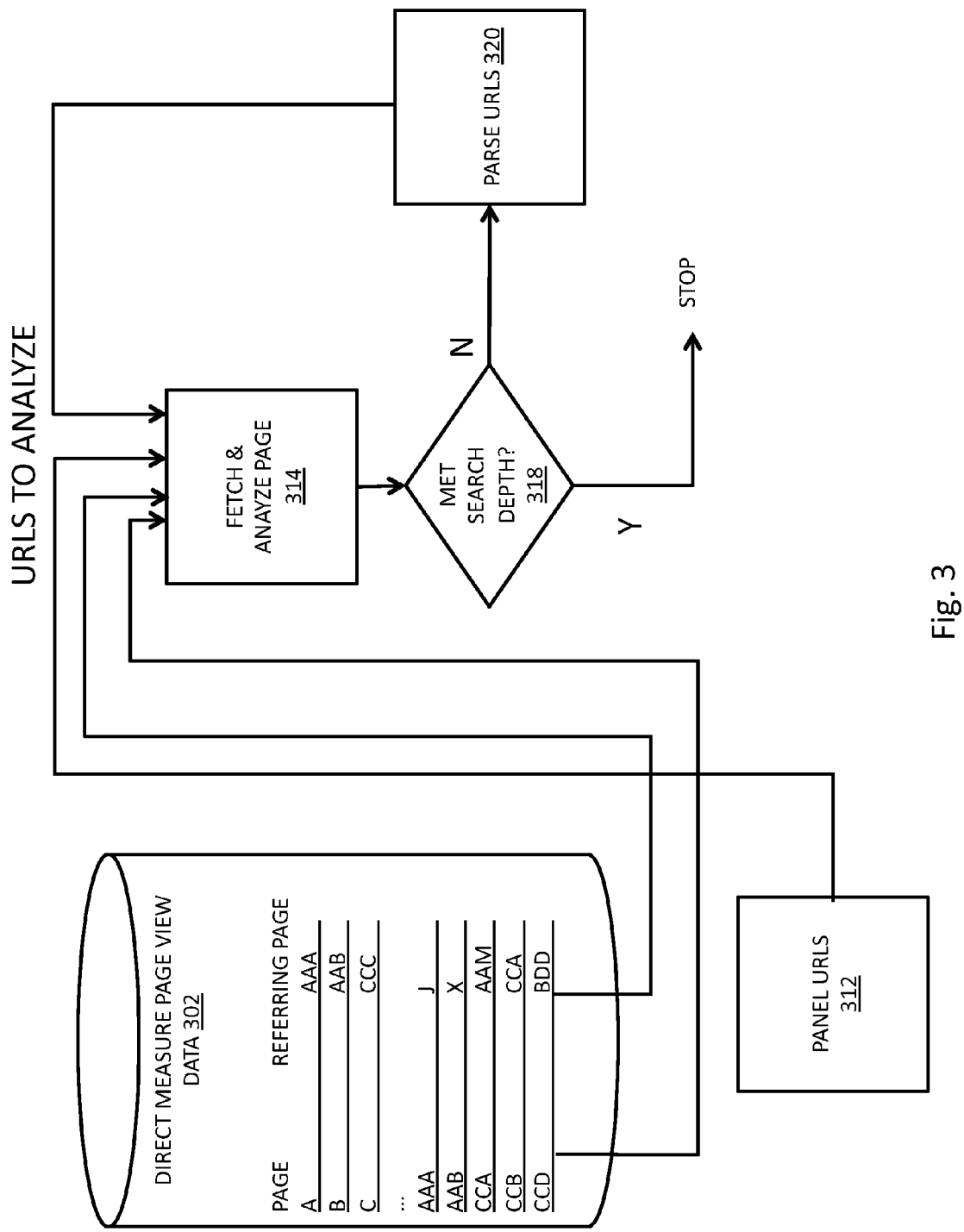
FIG. 3 depicts analyzing direct measurement page view data for referring tag placement.

In reference to FIG. 3, which depicts elements for determining if a referring page can be found in a direct page view data set, direct measure page view data set 302 may include a list of pages that have been viewed. Each entry in the list may also include an identification of a referring page. Each referring page identification may be selected and used in a search or lookup process that checks for the presence of the referring page in the list of pages that have been viewed. If the referring page is identified in the list of pages that have been viewed, then it may be determined that the active tag in the referring page is properly installed and functioning. For example, for Page 'A', it is noted that the referring page is Referring Page 'AAA'. Since Referring Page 'AAA' also appears in the list of Pages that have been viewed, then it may be determined that the active tag in Page 'AAA' is properly installed and functioning. However if the referring page is not identified in the list of pages that have been viewed, then a diagnostic function, such as to analyze the referring page for a direct measurement tag may be executed. For example, for Page 'C', the Referring Page is 'CCC'. However, 'CCC' does not appear in the list of pages that have been viewed. Thus, a diagnostic function to analyze Referring Page 'CCC' for a direct measurement tag may be executed. It is noted that while all referring pages should include a direct measurement page view tag, not every referring page may be viewed and therefore be identifiable in the list of viewed pages even if the referring page has a valid functioning direct measurement page view tag.

Continuing with reference to FIG. 3, and in another embodiment, all of the pages in the direct measure page view data set 302 as well as panel URLs 312 may be sources of URLs for analysis by the verification system. URLs from the direct measure page view data set 302 as well as panel URLs may be fetched and analyzed 314 for a properly installed and functioning tag. At step 318, if the depth to which to explore the domain has been met by the URL analyzed, then the verification process stops. If the search depth has not been met, then the URL is parsed 320 to obtain internal links to pages. These new pages are fetched and analyzed 314 as previously.

In embodiments, the process outlined in FIG. 3 may be implemented as a batch strategy at the per-site level. The process of FIG. 3 determines if a site has enough overall coverage, and if it is not, it may be crawled en masse.

Verifying direct page view tag placement may alternatively be performed by identifying an incorrectly tagged webpage by counting a plurality of page views in an identical timeframe. Identifying an incorrectly tagged page may include accessing page view data for a plurality of web pages over a predetermined timeframe and comparing a first count of page views to a second count of page views over the predetermined time frame, wherein the second count may be from a second data source. Significant variation in the first and second counts may indicate an incorrectly placed tag, a malfunctioning tag, a lack of a tag in the page, and the like. Alternatively, panelists may be identified in the direct measure data and counts attributed to the panelists in both the panel data and the direct measure data should match exactly. A variance may be due to a tagging fault.

An alternate strategy for verifying direct measurement page view tag placement on webpages may include comparing normalized page view numbers from a panel of users to page view numbers from direct measurement tag code to determine if the variance in the numbers exceeds a threshold. This strategy may include a method for verifying page view code placement on webpages by receiving normalized page view data derived from the panel data associated with the webpage, receiving direct page view data from measurement code associated with that webpage, and analyzing the normalized page view data in the direct page view data to determine a variance. The variance may then be compared to a threshold, such as a threshold based on site specific attributes (e.g. site size, sites type, site traffic, site update recency, site use of templates, and the like).

Figure 4:
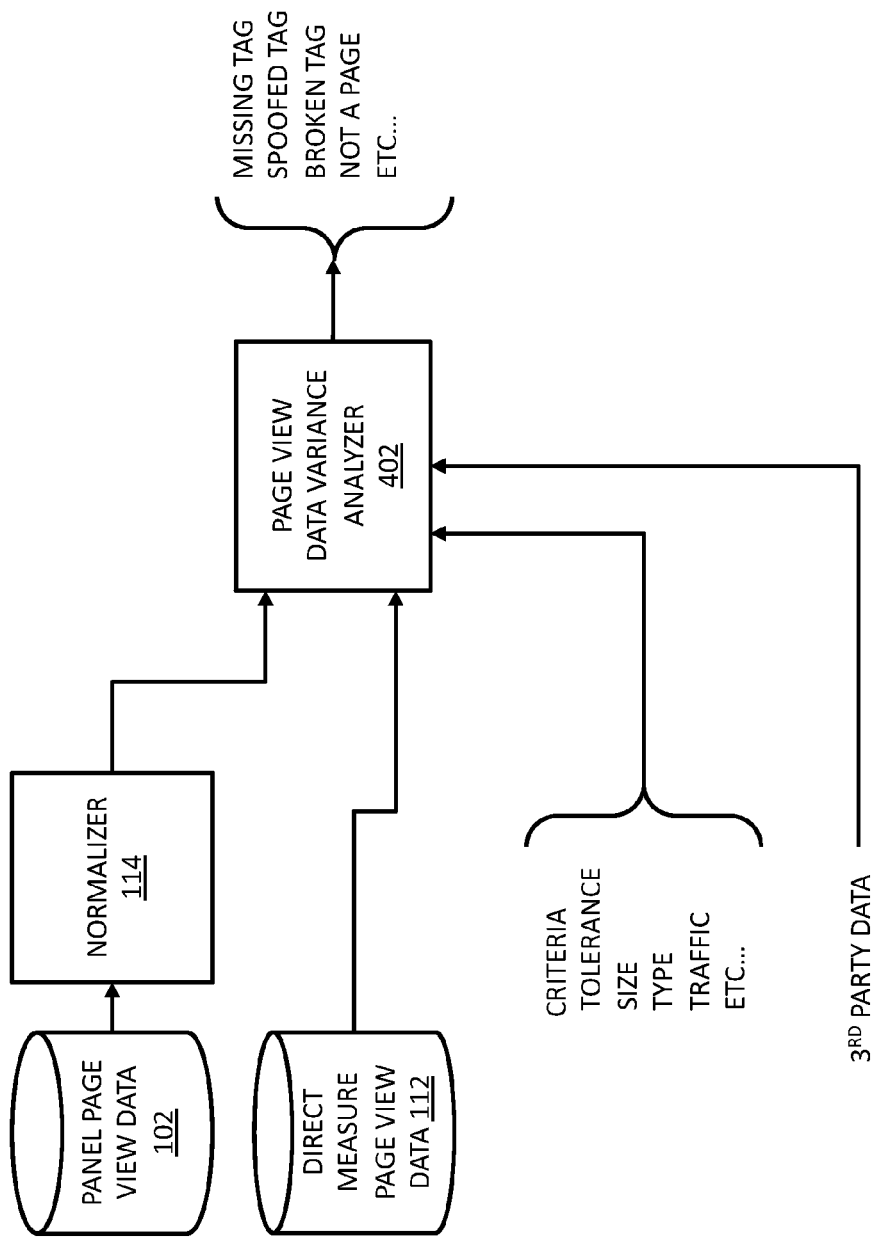
FIG. 4 depicts a technique for threshold-based page view variance analysis.

Referring to FIG. 4, which depicts a system and/or method for page view variance-based direct measurement code placement verification, a page view data variance analysis facility may consider a variance threshold based on a range of criteria and may output a variety of page view tag symptoms. In particular the embodiment of FIG. 4 includes panel page view data storage facility 102 which may provide panel page view data to page view data normalizer 114 which may output normalized panel page view data for variance analysis. Likewise, direct measure page view data storage facility 112 may provide direct page view data for variance analysis by page view data variance analyzer 402. Page view data variance analyzer 402 may compare normalized panel page view data and direct measure page view data to determine a variance in page views for a domain and/or for a specific webpage, and may further compare the determined variance to a page view variance threshold. The page view variance threshold may be dynamically adapted and or may be predetermined based on website related criteria that may be accessible to the analyzer 402. In an example of a dynamically adapted variance threshold, domain related metadata for a domain being analyzed for page view variance may be compared to website related criteria, such as a variance tolerance, domain page count, domain type, domain or webpage traffic metrics, and the like to adjust the variance threshold. The page view data variance analyzer 402 may also have access to third party data, such as search results, website owner data, sitemaps, domain template usage data, third party website metrics, and the like for facilitating dynamic adjustment in a variance threshold. Dynamic adjustment of the page view variance threshold may be implemented as a tolerance around a predetermined threshold or may result in a threshold being generated based on a set of rules or algorithms suitable for generating a page view variance threshold.

A page view data variance analyzer 402 may include computational resources and or software functionality including various algorithms for determining variance thresholds, variance threshold tolerances, page view variance, threshold criteria processing, third-party data processing, and the like. The page view data variance analyzer 402 may indicate a variety of potential problems associated with direct measurement page view functionality for pages that have a page view variance that exceeds a threshold. The analyzer 402 may determine that a tag is missing if the panel page view data is greater than zero and the direct measure page view data is zero. The analyzer 402 may predict other problems related to direct measure page view tags based on the information available to it, such as the raw page view data, the domain metadata, the threshold criteria, the third-party data, and the like. Predicted direct measure page view tag data problems may also include spoofed tags, broken tags, pages that are not viewable (e.g. a widget), and the like.

As described herein and elsewhere there may be a variety of direct measurement page view tag verification strategies available to facilitate verification of such tags. Determining which strategy to apply for each verification opportunity may be based on a variety of factors such as factors related to domain metadata, and or website parameters as well as information related to prior use of a verification strategy.

Figure 5:
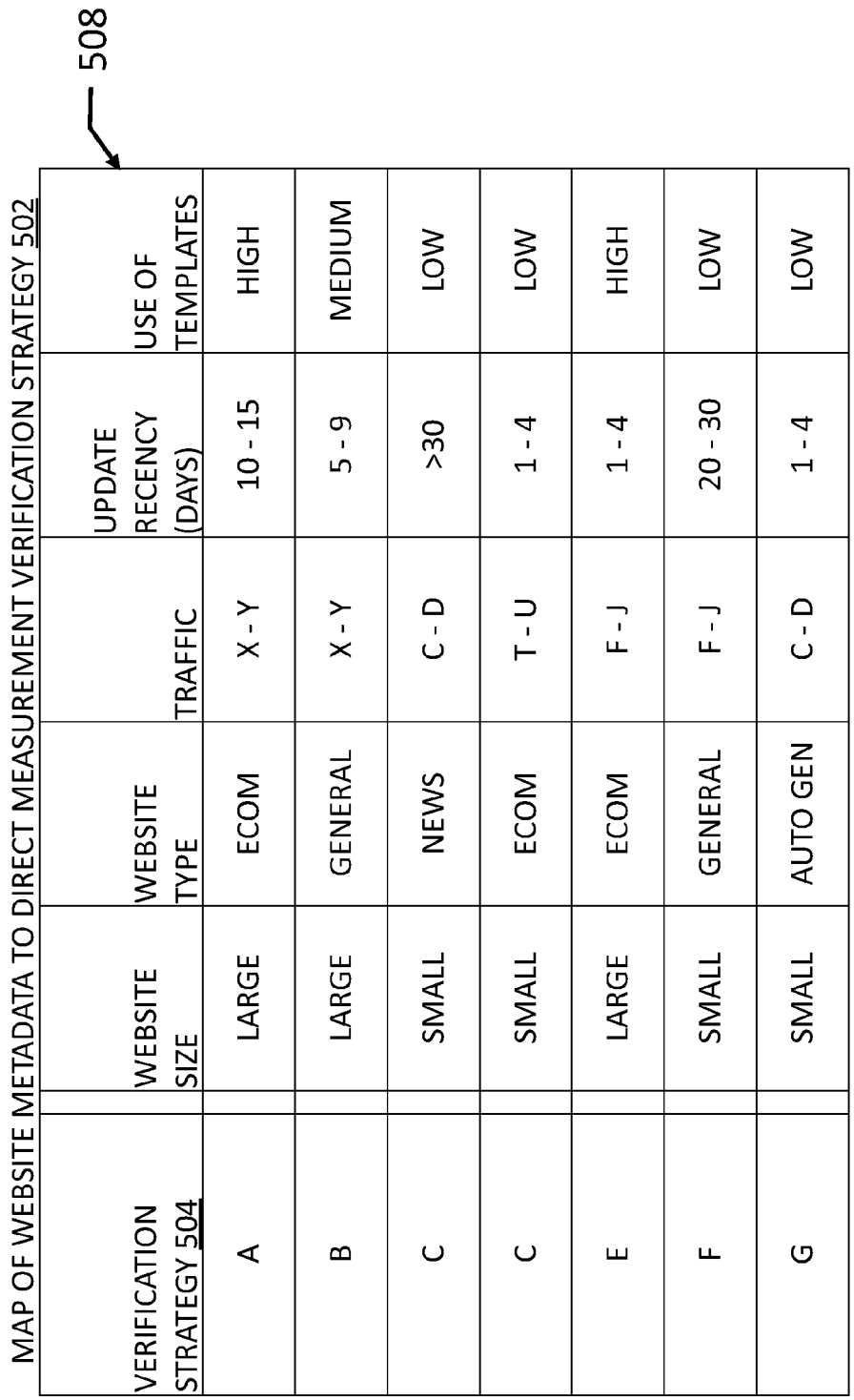
FIG. 5 depicts a map of website related data for selecting a direct measurement page view tag placement verification strategy.

Referring to FIG. 5, which depicts a verification strategy recommendation map 502 of website or domain metadata for recommending a direct measurement verification strategy, a variety of verification strategies 504 along with criteria for a variety of domain aspects 508 is shown in the map. The map 502 of FIG. 5 may facilitate selection of a direct page view measurement verification strategy based on various domain/website aspects 504, such as the website size, type, traffic metrics, recency, use of templates, and the like. In an example of using website related metadata to facilitate selecting direct page view measurement verification strategy, a small e-commerce website with low template use may be verified by verification strategy C.

Figure 6:
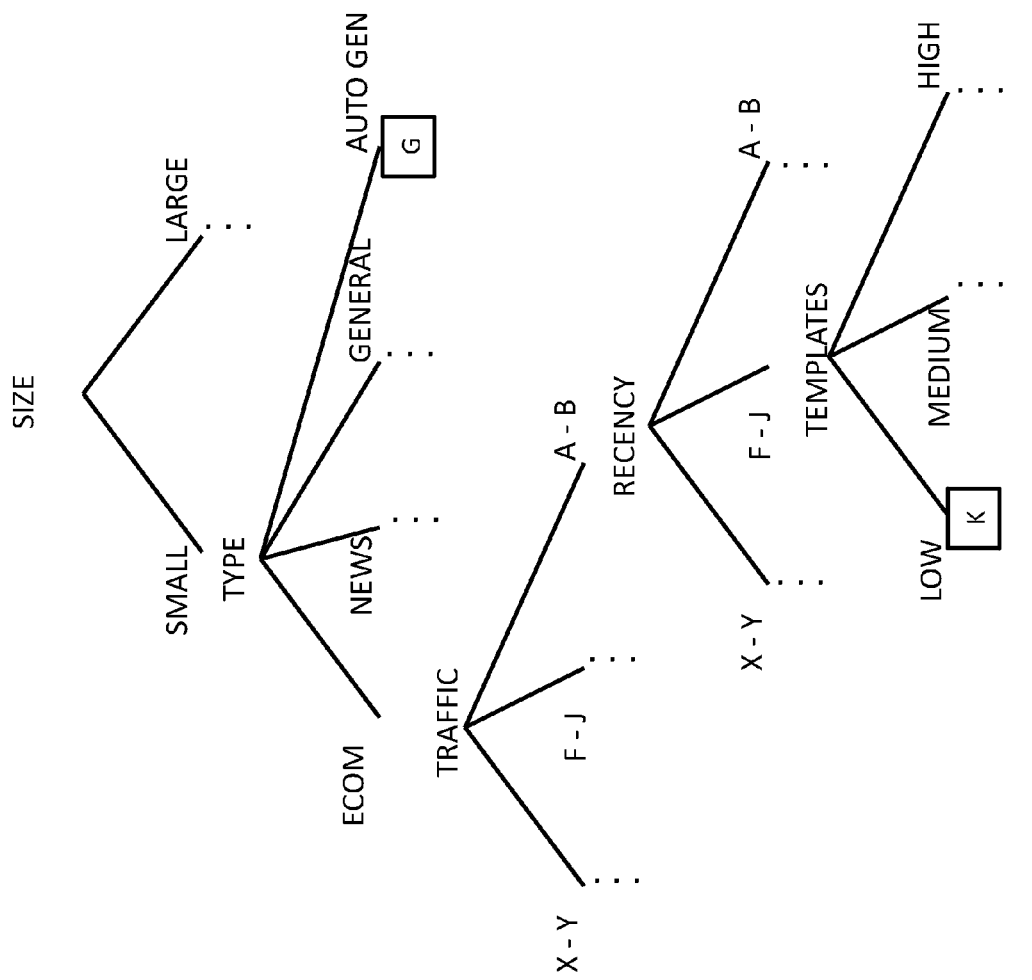
FIG. 6 depicts a decision tree that may rely upon the map of FIG. 6 for automated direct page view measurement tag verification strategy selection.

An alternative way of using information such as that found in table 502 to select a verification strategy may include automated decision tree analysis of domain and or website related metadata. Automated decision tree analysis for verification analysis selection is depicted in FIG. 6. In the example depicted in FIG. 6, website size is at the top of the decision tree followed by website type, traffic, recency of page updates, and use of templates. At each level in the decision tree analysis may be performed on the particular domain metadata, such as website type, to determine if a particular verification strategy is suitable for use with the website or if further metadata analysis must be evaluated, such as website traffic. Particularly in the example of FIG. 6, a small automatically generated website may be effectively verified by direct page view measurement verification strategy G. Although not provided explicitly in detail, each branch at each level may further branch into additional lower decision levels so that, for example website type for either a small or a large website may result in different verification strategy guidance.

In addition to direct page view measurements verification, direct measurement code may include features that may facilitate improved direct page view measurement results. One such example may include page view measurement code that identifies the kind of environment in which the code is running and further identifies if the code should not fire a page view count. In particular, such a method of page view measurement verification may include executing code, such as JavaScript or the like, that detects an execution environment of a webpage containing the code and comparing the detected execution environment to a page view measurement acceptability criteria to determine if the detected environment meets the page view acceptability criteria prior to counting the page as being viewed by a user. In this way the page view measurement code can trigger a page view if the environment indicates that a page view should be triggered or it may withhold triggering a page view if the environment indicates otherwise.

Figure 7:
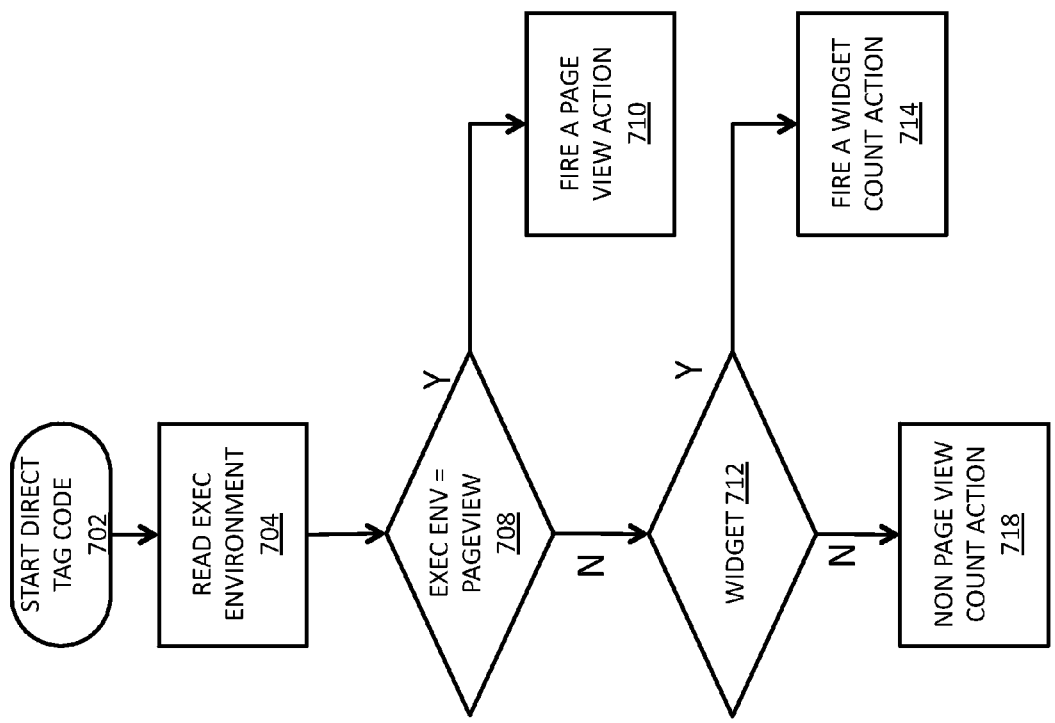
FIG. 7 depicts a flow of tag code that may facilitate improving page view count for various environments and web page types (e.g. widgets).

Referring to the embodiment of FIG. 7, an exemplary direct measurement page view tag code execution flow is depicted. The flow starts with executing the tag code 702, followed by the executing tag code reading the execution environment at step 704, followed by a determination of the page view environment indicating that a page view should be triggered at step 708. If a page view should be triggered at step 708 a page view fire action may be executed at step 710. However if the environment is determined to not support firing a page view action, the environment may be evaluated to determine if it complies with a known widget environment such as a widget environment at step 712. If the execution environment is determined to be a known widget, then a widget count action may be fired at step 714. If the execution environment is neither a page view environment nor a widget environment then a non-page view count action may be executed at step 718. A non-page view count action may include creating one or more new entries in a widget identification table that may be used in step 712, and the like.

Verification of tag placement in a webpage may be as simple as looking for a literal sequence of characters in the page. However for proper operation of a found tag, other elements about a page must be considered, such as if the literal sequence is in a commented section of the page. Although it may be possible to include rules in a tag placement verification platform for specific tag placement exceptions such as commented code, techniques that facilitate emulated execution of the webpage may provide significantly better tag placement verification. An emulation environment for direct measurement page view tag verification may facilitate running a page in its native environment to demonstrate that the tag code is properly signaling a page view. This additional step of emulating or actually executing the tag code in its native environment ensures that not only is the tag properly placed but it also is functioning properly.

Alternatively the code provided to a web browser from the webpage may be fed into a parser that may be configured to analyze the webpage content in a structured way to determine if a direct measurement page view tag is properly placed and executable.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, cloud servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, cloud servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of measurement code placement verification, comprising:
   deriving web page identification data from a user clickstream data set;
   determining a URL associated with a domain based on the webpage identification data;
   providing the URL and the depth to which to explore the domain as inputs to a measurement code verification web crawler; and
   using the web crawler to verify measurement code placement at the domain.

2. The method of claim 1, further comprising crawling linked pages in the domain with the web crawler based on links found in the URL.

3. A method, comprising:
   identifying a domain for measurement code placement verification;
   determining a webpage URL associated with the domain; and
   configuring a measurement code verification web crawler with the URL and a link distance relative to the webpage, whereby the measurement code verification web crawler is configured to verify placement of measurement code on a portion of web pages associated with the domain that are accessible via the webpage URL.

4. The method of claim 3, wherein determining a webpage URL involves consulting a clickstream.

5. A method of measurement code placement verification, comprising:
   receiving web page identification data that is derived from search result data;
   determining a URL associated with a domain based on the webpage identification data;
   providing the URL and the depth to which to explore the domain as inputs to a measurement code verification web crawler; and
   verifying placement of measurement code using the web crawler.

6. The method of claim 5, further comprising crawling linked pages in the domain with the web crawler based on links found in the URL.

7. A method, comprising:
   analyzing search result data to determine a candidate domain for measurement code placement verification;
   determining a webpage URL associated with the domain; and
   configuring a measurement code verification web crawler with the URL and a link distance relative to the webpage, whereby the measurement code verification web crawler is configured to verify measurement code placement on a portion of web pages associated with the domain that are accessible via the webpage URL.

8. A method of measurement code placement verification, comprising:
   receiving domain location information for a domain for which pages present in at least one traffic data source are absent from a directly measured traffic data stream;
   determining a URL associated with a domain based on the domain location information; and
   providing the URL and the depth to which to explore the domain as inputs to a measurement code verification web crawler for verifying placement of measurement code using the web crawler.

* * * * *